US012703565B2

(12) United States Patent
Fernandez

(10) Patent No.: US 12,703,565 B2
(45) Date of Patent: Aug. 11, 2026

(54) REFUSE CONTAINER TO HOLD PIECES OF USED CHEWING GUM

(71) Applicant: Cristina Fernandez, Redlands, CA (US)

(72) Inventor: Cristina Fernandez, Redlands, CA (US)

( * ) Notice: Subject to any disclaimer, the term of this patent is extended or adjusted under 35 U.S.C. 154(b) by 0 days.

(21) Appl. No.: 18/953,351

(22) Filed: Nov. 20, 2024

(65) Prior Publication Data

US 2026/0138818 A1 May 21, 2026

(51) Int. Cl.
*B65F 1/06* (2006.01)
*B65F 1/16* (2006.01)

(52) U.S. Cl.
CPC .............. *B65F 1/06* (2013.01); *B65F 1/1615* (2013.01); *B65F 1/1623* (2013.01); *B65F 1/1646* (2013.01); *B65F 2001/1676* (2013.01); *B65F 2240/14* (2013.01)

(58) Field of Classification Search
CPC ........ B65F 1/06; B65F 1/1615; B65F 1/1623; B65F 1/1646; B65F 2001/1676; B65F 2240/14
USPC .......................... 220/495.08, 495.07, 495.01
See application file for complete search history.

(56) References Cited

U.S. PATENT DOCUMENTS 2,757,859 A * 8/1956 Holland .................... B65F 1/06 220/495.08
2,896,841 A * 7/1959 Malone ................... A24F 19/14 232/43.2
3,893,615 A * 7/1975 Johnson .................. B65F 1/067 220/495.08
4,494,674 A * 1/1985 Roof .................. B65D 43/0212 220/795
4,718,571 A * 1/1988 Bordner ............. B65D 43/0258 206/508
5,031,793 A * 7/1991 Chen ....................... B65F 1/062 220/531
5,125,526 A * 6/1992 Sumanis ................... B65F 1/06 220/264
5,574,254 A * 11/1996 Mori ....................... H02G 3/088 220/DIG. 14
5,655,677 A * 8/1997 Fratello .................. B65G 51/06 406/186
5,813,200 A * 9/1998 Jacoby .................. B65F 1/1615 53/567

(Continued)

FOREIGN PATENT DOCUMENTS

WO WO2012145067 10/2012

*Primary Examiner* — Ernesto A Grano
*Assistant Examiner* — Symren K Sanghera

(57) ABSTRACT

A refuse container to hold pieces of used chewing gum includes a receptacle, a top cover, a bottom cover, and a bag. The top cover is pivotable to cover and uncover a top opening. A ring is detachably coupled around the top opening. A tube is coupled to the ring and extends along the ring. The bag is sleeve-shaped and includes a stored portion that is rolled up inside the tube and a closed bottom portion extending out through a slot in the tube and across the top opening. The bottom cover is pivotable to cover and uncover a bottom opening. The bottom cover includes an anchor connectable to the closed bottom portion. The anchor is rotatable to twist the bag about a piece of used chewing gum deposited on the bag and also draw and unroll an additional portion of the bag further out of the tube.

12 Claims, 9 Drawing Sheets

(56) References Cited

U.S. PATENT DOCUMENTS

| | | | | | |
|---|---|---|---|---|---|
| 5,954,221 | A * | 9/1999 | Boland | B65F 1/0006 | 220/495.08 |
| 6,390,323 | B1 * | 5/2002 | Alticosalian | A47K 11/06 | 220/495.07 |
| 6,672,472 | B1 * | 1/2004 | Rockwood | B65F 1/1468 | 220/495.08 |
| D573,767 | S | 7/2008 | Milton, Jr. | | |
| 7,802,696 | B2 | 9/2010 | Moore | | |
| 7,854,344 | B2 * | 12/2010 | Suk | B65D 85/72 | 220/784 |
| 7,992,742 | B1 * | 8/2011 | Kim | B65F 1/163 | 220/495.08 |
| 8,091,325 | B2 * | 1/2012 | Stravitz | B65B 9/15 | 53/567 |
| 8,448,814 | B2 * | 5/2013 | Yamamoto | H05K 5/15 | 403/345 |
| 8,453,839 | B1 | 6/2013 | Choma | | |
| 8,635,838 | B2 * | 1/2014 | Dunn | B32B 27/28 | 53/284.7 |
| 8,714,349 | B2 * | 5/2014 | Eddy | B65F 1/00 | 206/800 |
| 8,910,821 | B1 * | 12/2014 | Stravitz | B65F 1/163 | 220/495.08 |
| 8,919,560 | B2 | 12/2014 | Hopkins | | |
| 8,959,880 | B2 * | 2/2015 | Morand | B65B 67/1222 | 206/397 |
| 9,345,369 | B2 * | 5/2016 | Livingston | A47K 11/02 | |
| 11,661,271 | B1 * | 5/2023 | Chan | B65F 1/06 | 220/495.11 |
| 2003/0121923 | A1 * | 7/2003 | Morand | A47K 11/02 | 220/495.07 |
| 2006/0078411 | A1 * | 4/2006 | Casab | B65F 1/1615 | 414/408 |
| 2006/0261072 | A1 * | 11/2006 | Diep | B65F 1/062 | 220/495.07 |
| 2007/0157581 | A1 * | 7/2007 | Webb | B65F 1/1426 | 53/576 |
| 2009/0159609 | A1 | 6/2009 | Tussy | | |
| 2012/0225163 | A1 | 9/2012 | Guyot | | |
| 2013/0056471 | A1 | 3/2013 | Ervin | | |
| 2015/0021334 | A1 * | 1/2015 | Morand | B65D 43/26 | 220/495.08 |
| 2015/0076153 | A1 * | 3/2015 | Rousso | B65B 67/1211 | 220/495.08 |
| 2016/0167873 | A1 * | 6/2016 | Dunn | B65F 1/062 | 220/495.07 |
| 2016/0366996 | A1 * | 12/2016 | Chao | H05K 5/061 | |
| 2017/0070040 | A1 * | 3/2017 | Kawada | H02G 3/08 | |
| 2018/0270977 | A1 * | 9/2018 | Coenegracht | H05K 5/0226 | |
| 2021/0119424 | A1 * | 4/2021 | Coenegracht | G02B 6/445 | |
| 2023/0219748 | A1 * | 7/2023 | Ye | B65F 1/1405 | 220/495.08 |
| 2024/0225391 | A1 * | 7/2024 | Fitzsimmons | A47L 9/1608 | |
| 2024/0391653 | A1 * | 11/2024 | Collomb | B65D 43/0208 | |
| 2025/0019157 | A1 * | 1/2025 | Yu | B65F 1/062 | |
| 2025/0282531 | A1 * | 9/2025 | Bullock | A47J 47/02 | |

* cited by examiner

REFUSE CONTAINER TO HOLD PIECES OF USED CHEWING GUM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to pocket-sized refuse containers and more particularly pertains to a new refuse container for holding pieces of used chewing gum. As is well known, discarded chewing gum can be a substantial problem in areas of high population, especially areas with large concentrations of young people, who are more prone to chew gum. Used chewing gum is unsightly and often very difficult to remove from surfaces. Further, due to the disposable and seemingly biodegradable nature of chewing gum, people are more likely to just spit out gum or stick it on a surface rather than take the time to properly dispose of the used gum in a waste receptacle. The new refuse container is a pocket-sized device similar to the size of a 1.5 to 2 ounce bottle of hand sanitizer or a carrying case for wireless earbuds, which is designed to provide a user with a convenient way to dispose of used pieces of chewing gum to minimize litter.

(2) Description of Related Art Including Information Disclosed Under 37 CFR 1.97 and 1.98

The prior art relates to chewing gum disposal containers that utilize paper sheets or are large containers mounted in a fixed area. The prior art, as best understood, does not disclose a refuse container to hold up to 20 pieces of used chewing gum, wherein the refuse container includes a receptacle and a top cover, wherein a bag is partially rolled up in a tube on a ring detachably coupled to the receptacle. A bottom cover includes an anchor projecting into the receptacle and connectable to the bag, wherein the anchor is rotatable to twist the bag about a piece of used chewing gum deposited on the bag and also draw and unroll an additional portion of the bag further out of the tube.

(h) BRIEF SUMMARY OF THE INVENTION

An embodiment of the disclosure meets the needs presented above in a refuse container to hold pieces of used chewing gum generally comprising a receptacle, a top cover, a bottom cover, and a bag. The receptacle is designed to contain up to 20 pieces of used chewing gum. The receptacle includes a perimeter wall. The perimeter wall includes a top edge portion that is positioned about a top opening and a bottom edge portion that is positioned about a bottom opening. The top cover is coupled to the receptacle at the top edge portion. The top cover is pivotable to cover and uncover the top opening. A ring is detachably coupled to the top edge portion. The ring is designed to extend around the top opening. A tube is coupled to the ring. The tube is designed to extend along an interior circumference of the ring. The tube includes a slot that is positioned in an upper portion of the ring and extending along the tube. The bag is sleeve-shaped. The bag includes a stored portion that is rolled up inside the tube and a closed bottom portion extending out through the slot and across the top opening. The bottom cover is coupled to the receptacle at the bottom edge portion. The bottom cover is pivotable to cover and uncover the bottom opening. The bottom cover includes an anchor projecting into the receptacle. The anchor is connectable to the closed bottom portion of the bag to hold the closed bottom portion of the bag. The anchor is rotatable to twist the bag about a piece of used chewing gum deposited on the bag and also draw and unroll an additional portion of the bag further out of the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
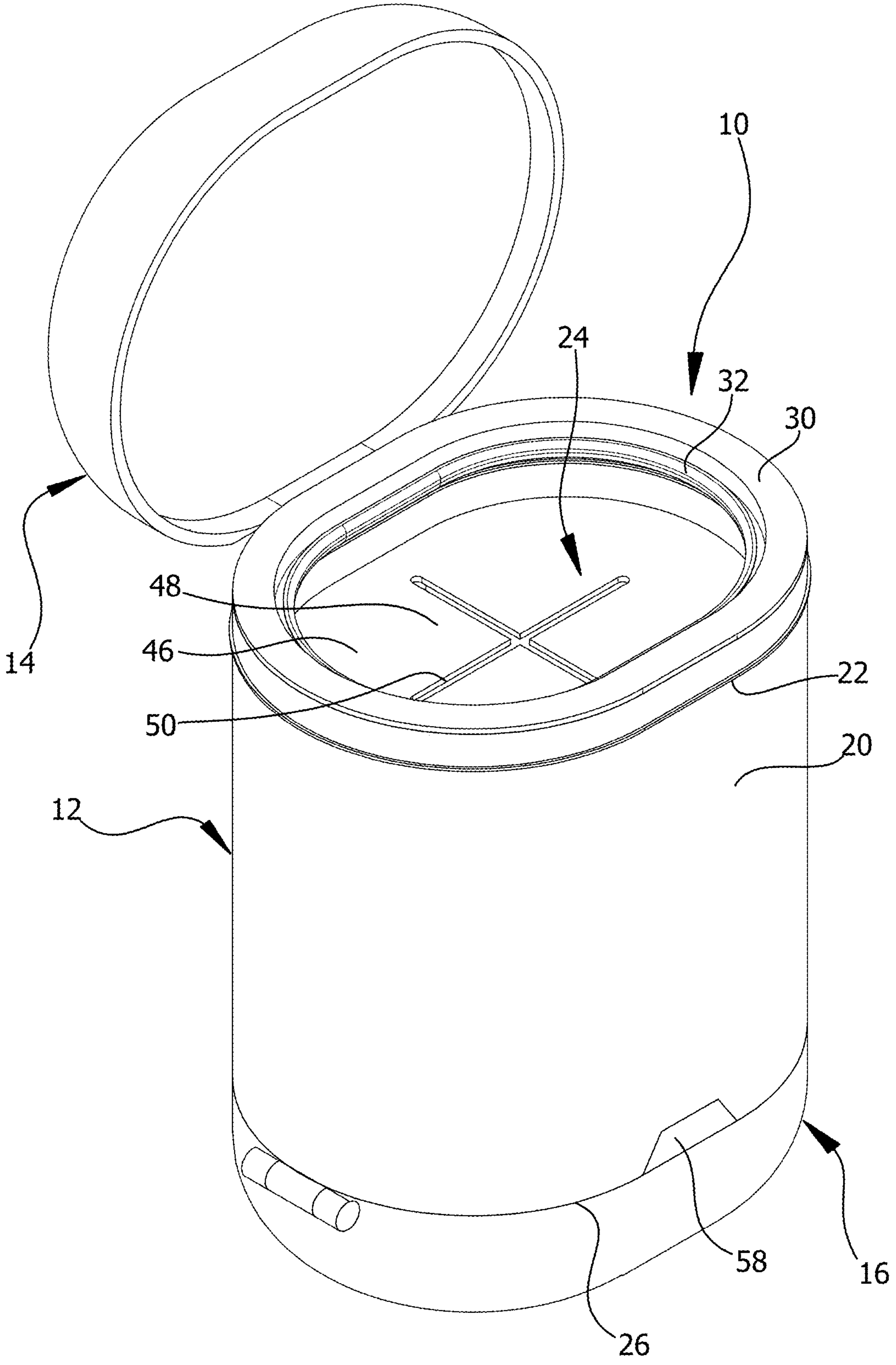
FIG. 1 is a perspective view of a refuse container according to an embodiment of the disclosure.
Figure 2:
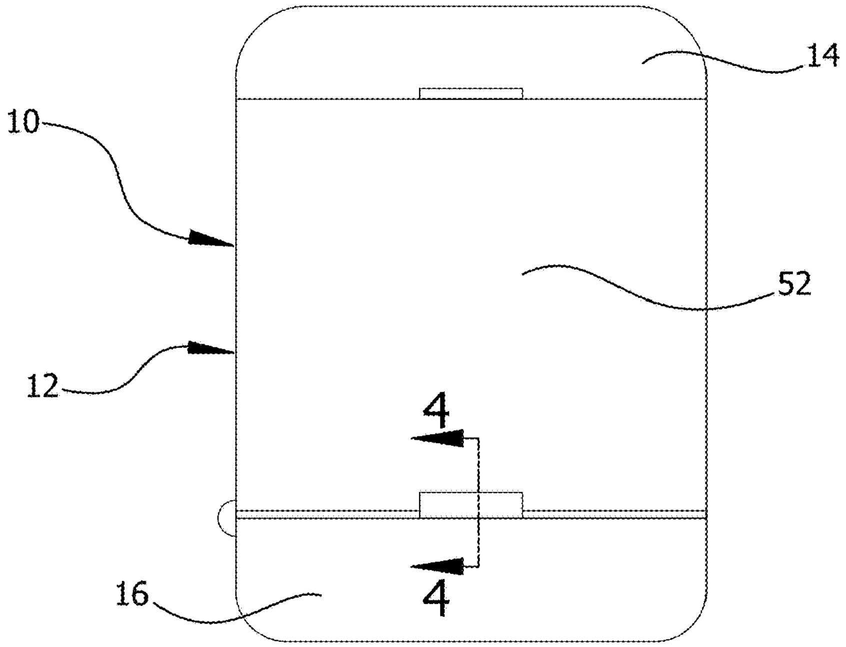
FIG. 2 is a front view of an embodiment of the disclosure.
Figure 3:
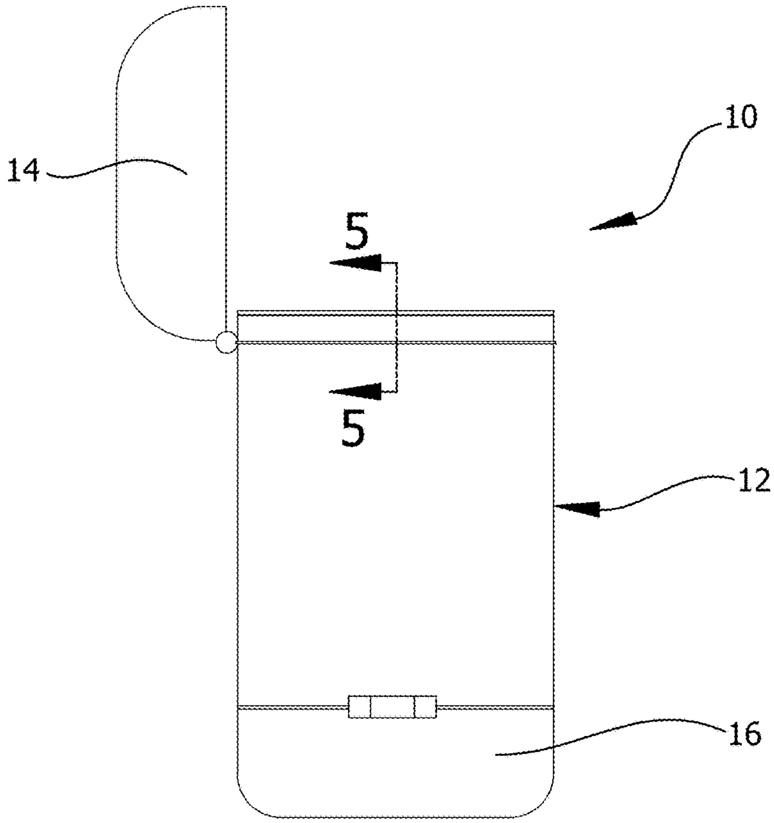
FIG. 3 is a side view of an embodiment of the disclosure.

With reference now to the drawings, and in particular to FIGS. 1 through 10 thereof, a new refuse container embodying the principles and concepts of an embodiment of the disclosure and generally designated by the reference numeral 10 will be described.

Figure 4:
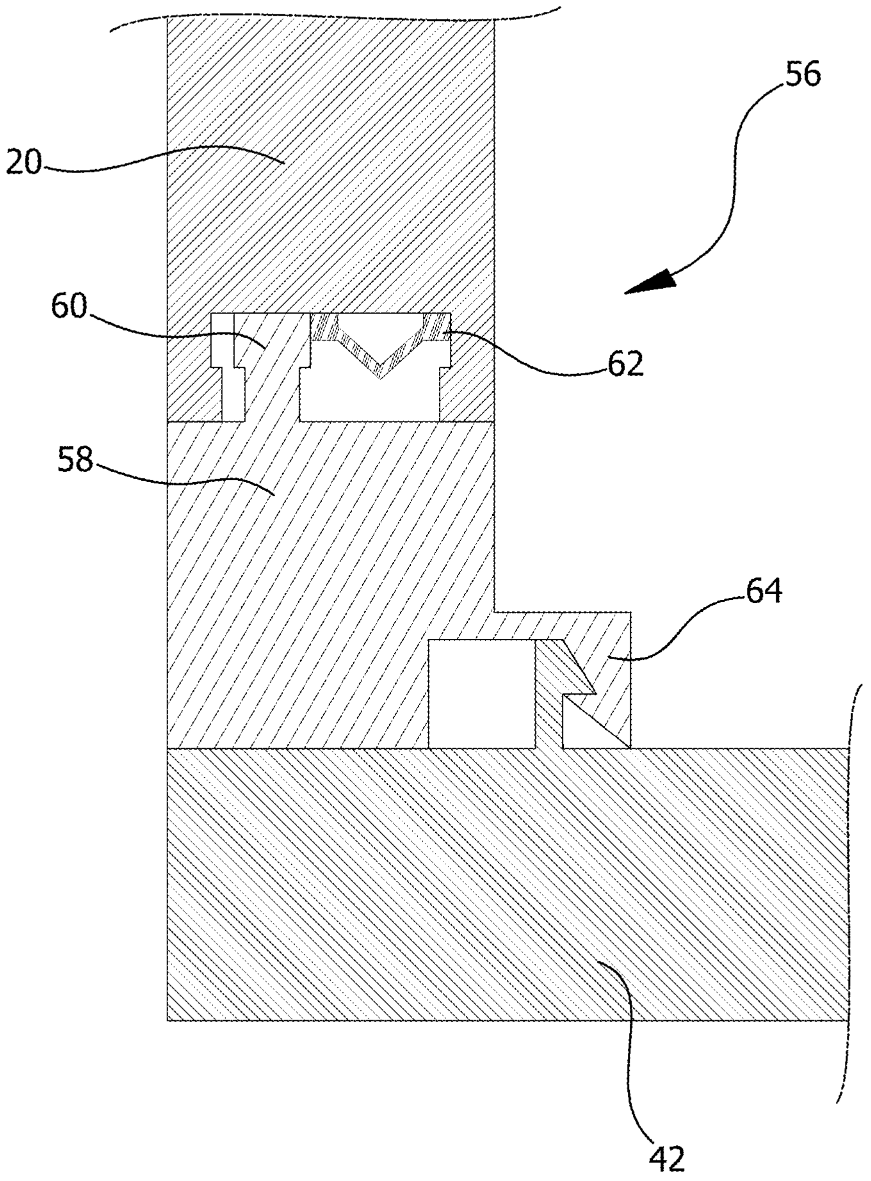
FIG. 4 is a cross-sectional view of a portion of an embodiment of the disclosure.
Figure 5:
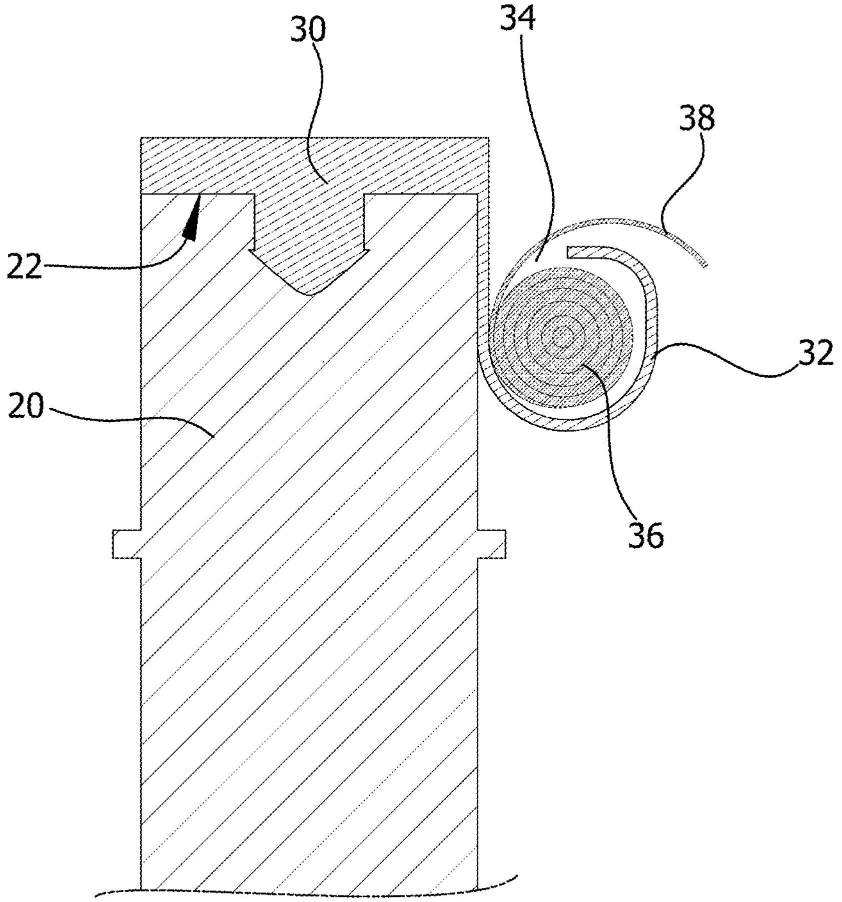
FIG. 5 is a cross-sectional view of a portion of an embodiment of the disclosure.
Figure 6:
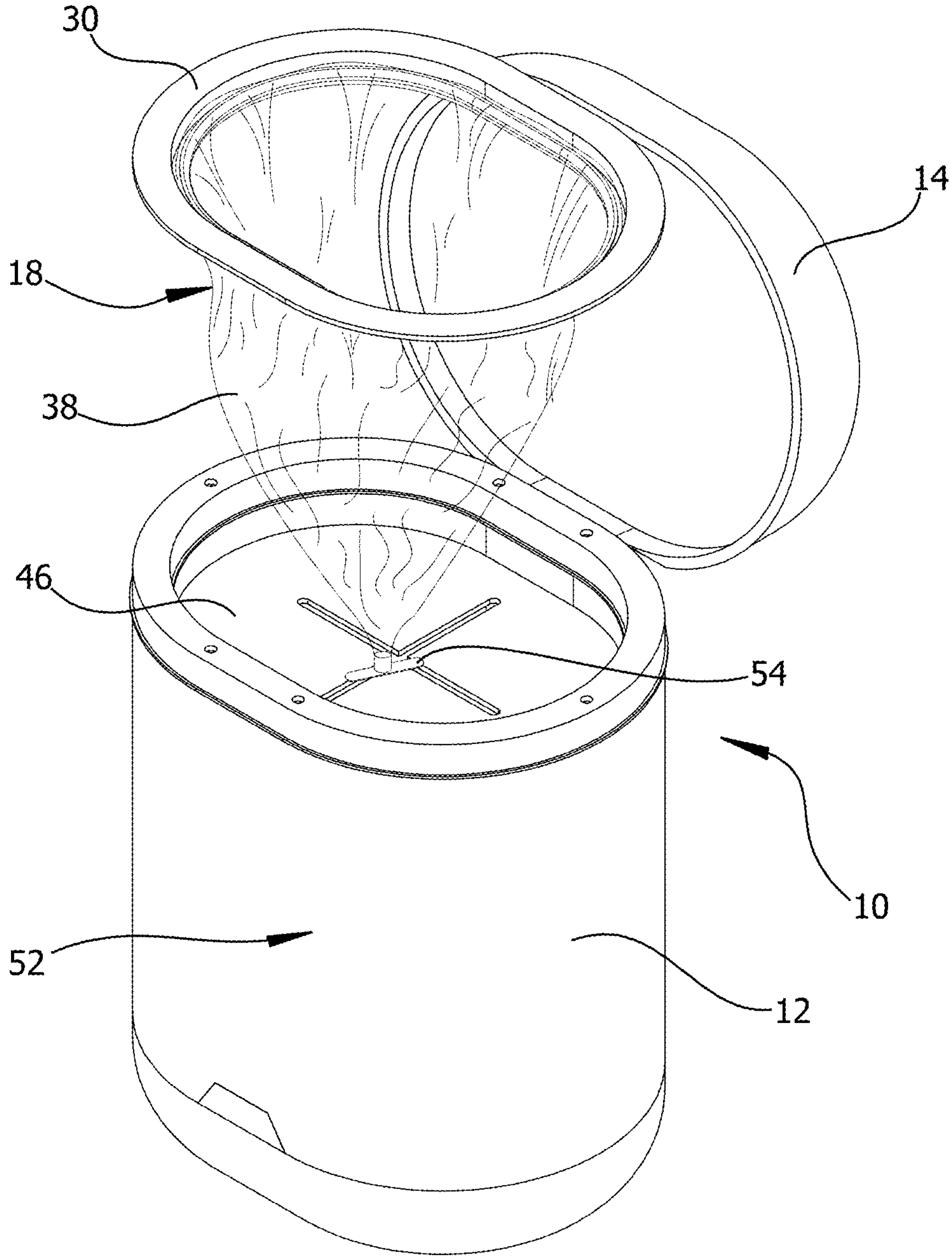
FIG. 6 is an exploded view of an embodiment of the disclosure.
Figure 7:
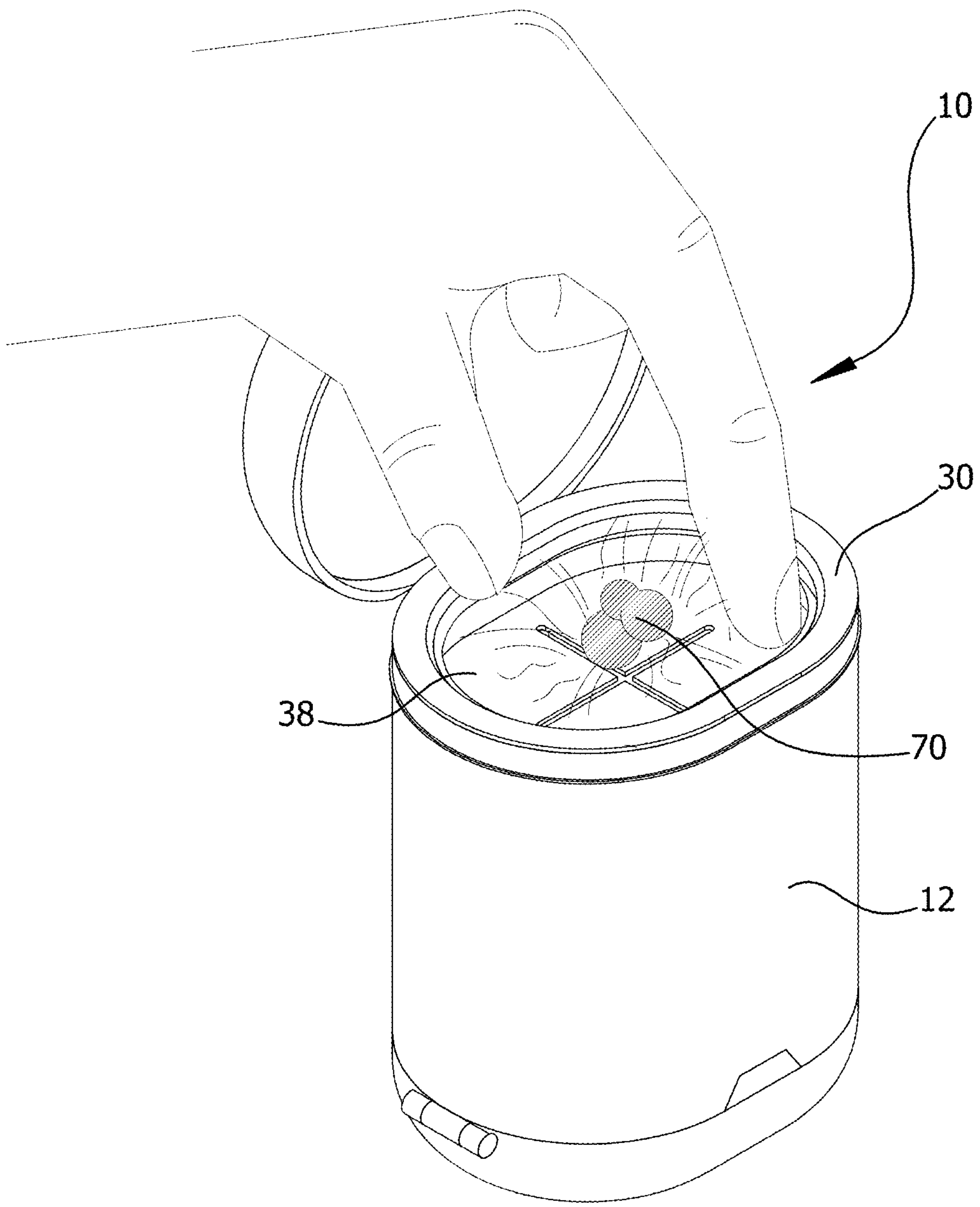
FIG. 7 is a perspective view of an embodiment of the disclosure in use.
Figure 8:
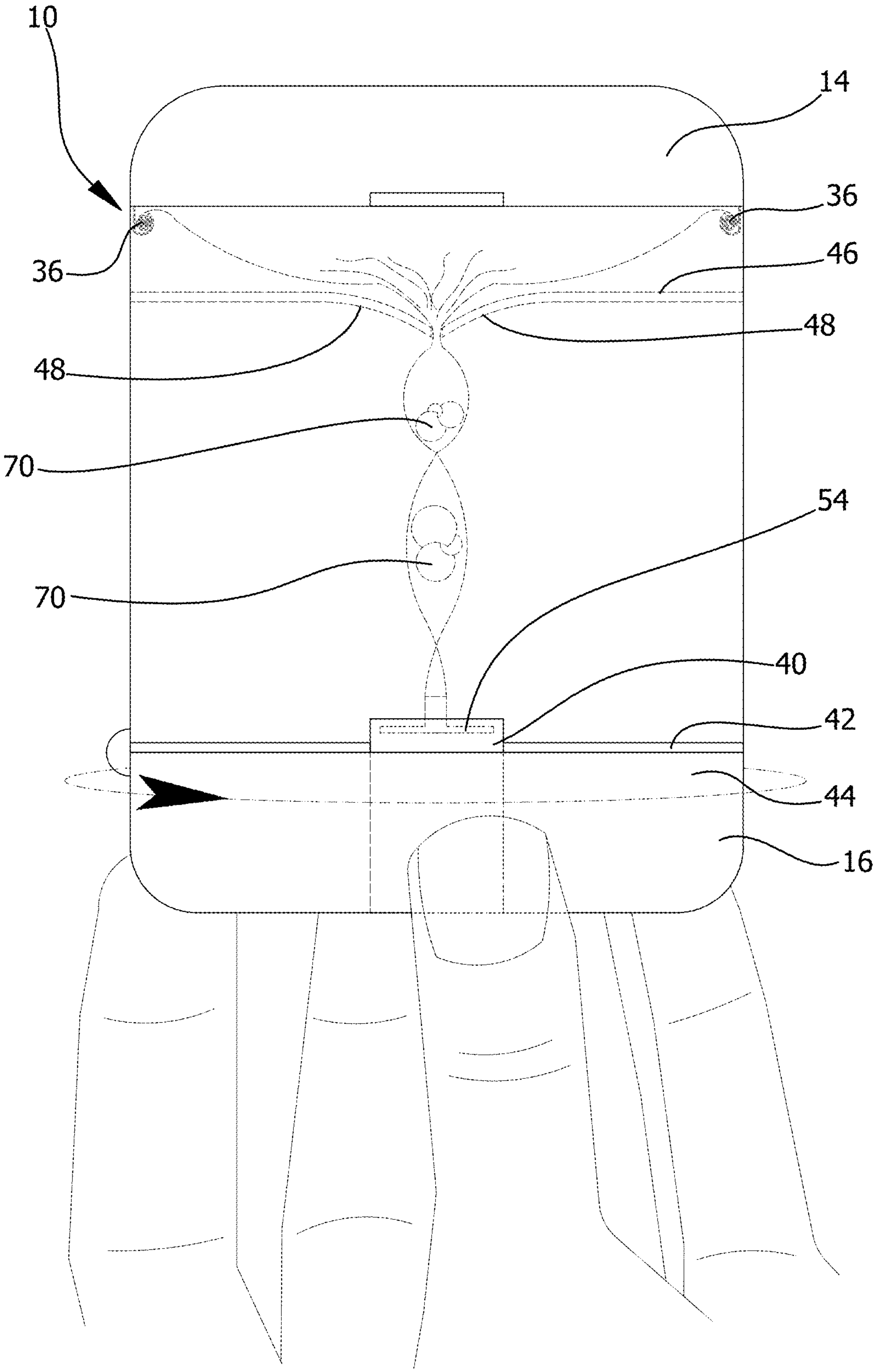
FIG. 8 is a front view of an embodiment of the disclosure in use.
Figure 9:
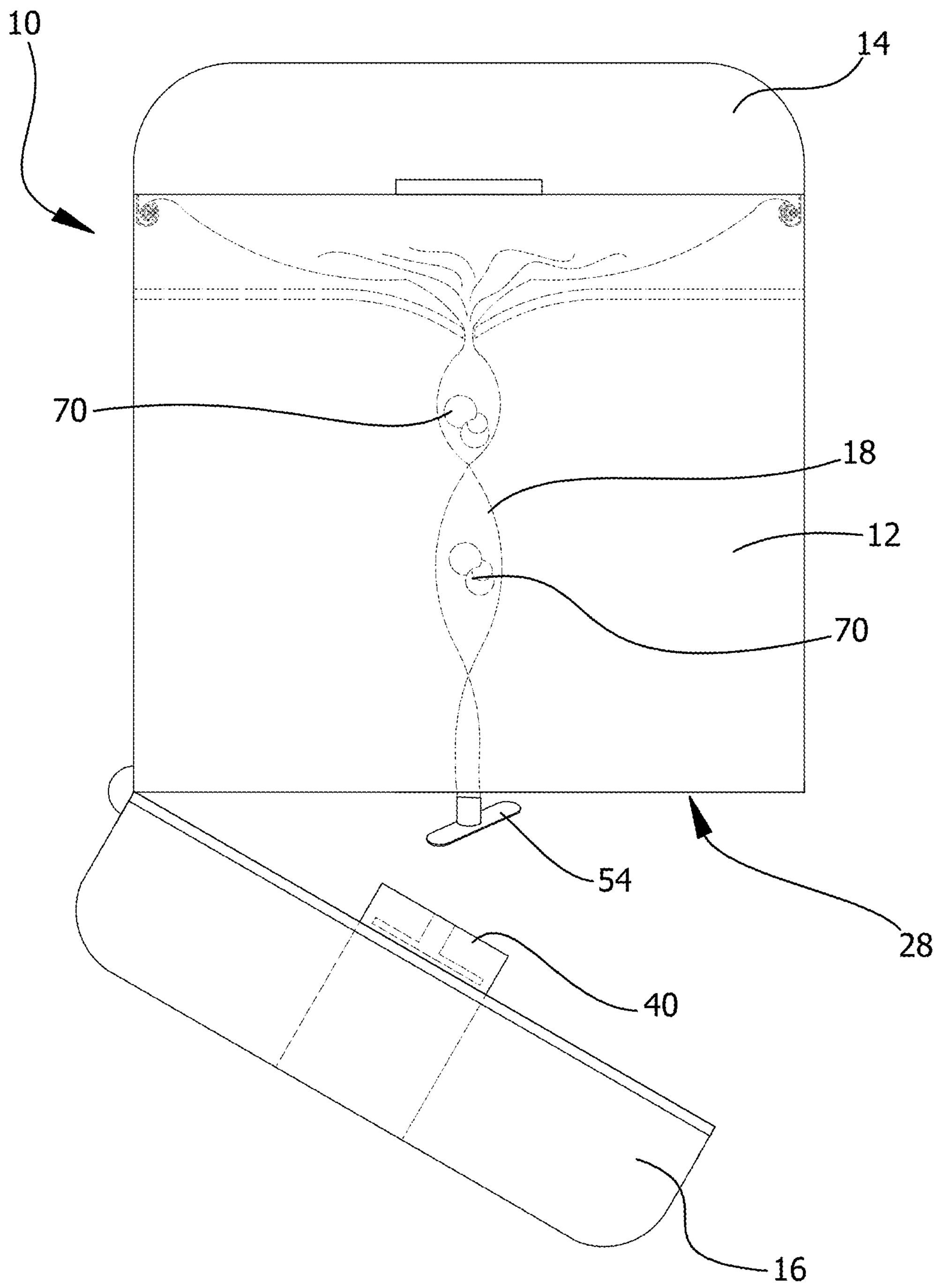
FIG. 9 is a front view of an embodiment of the disclosure in use.

As best illustrated in FIGS. 1 through 10, the refuse container 10 generally comprises a receptacle 12, a top cover 14, a bottom cover 16, and a bag 18. The receptacle 12 is designed to contain up to 20 pieces of used chewing gum, though in other possible embodiments the receptacle 12 could be designed to hold more or less than 20 pieces of used chewing gum. The receptacle 12 includes a perimeter wall 20. The perimeter wall 20 includes a top edge portion 22 that is positioned about a top opening 24 and a bottom edge portion 26 that is positioned about a bottom opening 28. The top cover 14 is coupled to the receptacle 12 at the top edge portion 22. The top cover 14 is pivotable to cover and uncover the top opening 24. A ring 30 is detachably coupled to the top edge portion 22. The ring 30 is designed to extend around the top opening 24. A tube 32 is coupled to the ring 30. The tube 32 is designed to extend along an interior circumference of the ring 30. As best seen in FIG. 5, the tube 32 includes a slot 34 that is positioned in an upper portion of the ring 30 and extending along the tube 32. As shown in FIG. 6, the bag 18 is sleeve-shaped. As best seen in FIG. 5, the bag 18 includes a stored portion 36 that is rolled up inside the tube 32 and, as best seen in FIG. 7, a closed bottom portion 38 extending out through the slot 34 and across the top opening 24. The bottom cover 16 is coupled to the receptacle 12 at the bottom edge portion 26. The bottom cover 16 is pivotable to cover and uncover the bottom opening 28, as shown in FIG. 9. The bottom cover 16 includes an anchor 40 projecting into the receptacle 12. As shown in FIGS. 8 and 9, the anchor 40 is connectable to the closed bottom portion 38 of the bag 18 to hold the closed bottom portion 38 of the bag 18. The anchor 40 is rotatable to twist the bag 18 about a piece of used chewing gum 70 deposited on the bag 18 and also draw and unroll an additional portion of the bag 18 further out of the tube 32.

As shown in FIG. 8, the bottom cover 16 is divided into a bottom plate 42 and a rotatable portion 44. The anchor 40 is rotatably coupled to the bottom plate 42 and attached to the rotatable portion 44. The rotatable portion 44 can be gripped and rotated with respect to the bottom plate 42. However, this is one exemplary embodiment and the anchor 40 could be rotated in other ways, such as by having the rotatable portion 44 of the bottom cover 16 be attached in a fixed manner to the bottom plate 42, and only the anchor 40 is rotatable with respect to the bottom plate 42.

In the exemplary embodiment in FIGS. 1 through 9, the refuse container 10 further includes a panel 46. The panel 46 is attached to an inner surface of the perimeter wall 20 adjacent and below the top edge portion 22. The panel 46 is positioned to divide an interior space in the receptacle 12 into an upper interior space and a lower interior space. The panel 46 includes central flaps 48 divided by slots 50 in the panel 46. The flaps 48 are resiliently flexible such that the flaps 48 temporarily deform when the piece of used chewing gum 70 is drawn through the flaps 48 and then return to cinch the bag 18 above the piece of used chewing gum 70. While a pair of slots 50 are shown in a cross pattern, in another possible embodiment there could be a single slot 50 or an orifice. In another possible embodiment, the panel 46 could be omitted.

The perimeter wall 20 is oval-shaped with a pair of opposing flat lateral sections 52. Each of the top cover 14 and the bottom cover 16 is dome-shaped. The receptacle 12 has a height in the range of 1.5 to 3.0 inches, a width in the range of 1.5 to 3.0 inches, and a depth in the range of 0.5 to 1.0 inch. This design is intended to mimic a storage case for wireless earbuds.

The refuse container 10 further includes a lock tab 54 that is attached to the closed bottom portion 38 of the bag 18. The lock tab 54 is designed to be detachably coupled to the anchor 40. In the exemplary embodiment, the lock tab 54 is a flat rod that can be inserted into a corresponding opening in the anchor 40 and turned 90 degrees to lock the lock tab 54 in place. However, this is only one exemplary embodiment and other connectors are well known and within the scope of the disclosure. In another possible embodiment, the lock tab 54 is omitted and the closed bottom portion 38 is directly held by the anchor 40, such as by a clip or tie.

Each of the top cover 14 and the bottom cover 16 is detachably coupled to the perimeter wall 20 by a spring-loaded snap assembly 56. An example of such a spring-loaded snap assembly 56 is shown in FIG. 4, wherein a release button 58 has a slide 60 that engages a spring lever 62 to release a latch 64. Other detachable connections such as snaps and buttons are within the scope of the disclosure.

Figure 10:
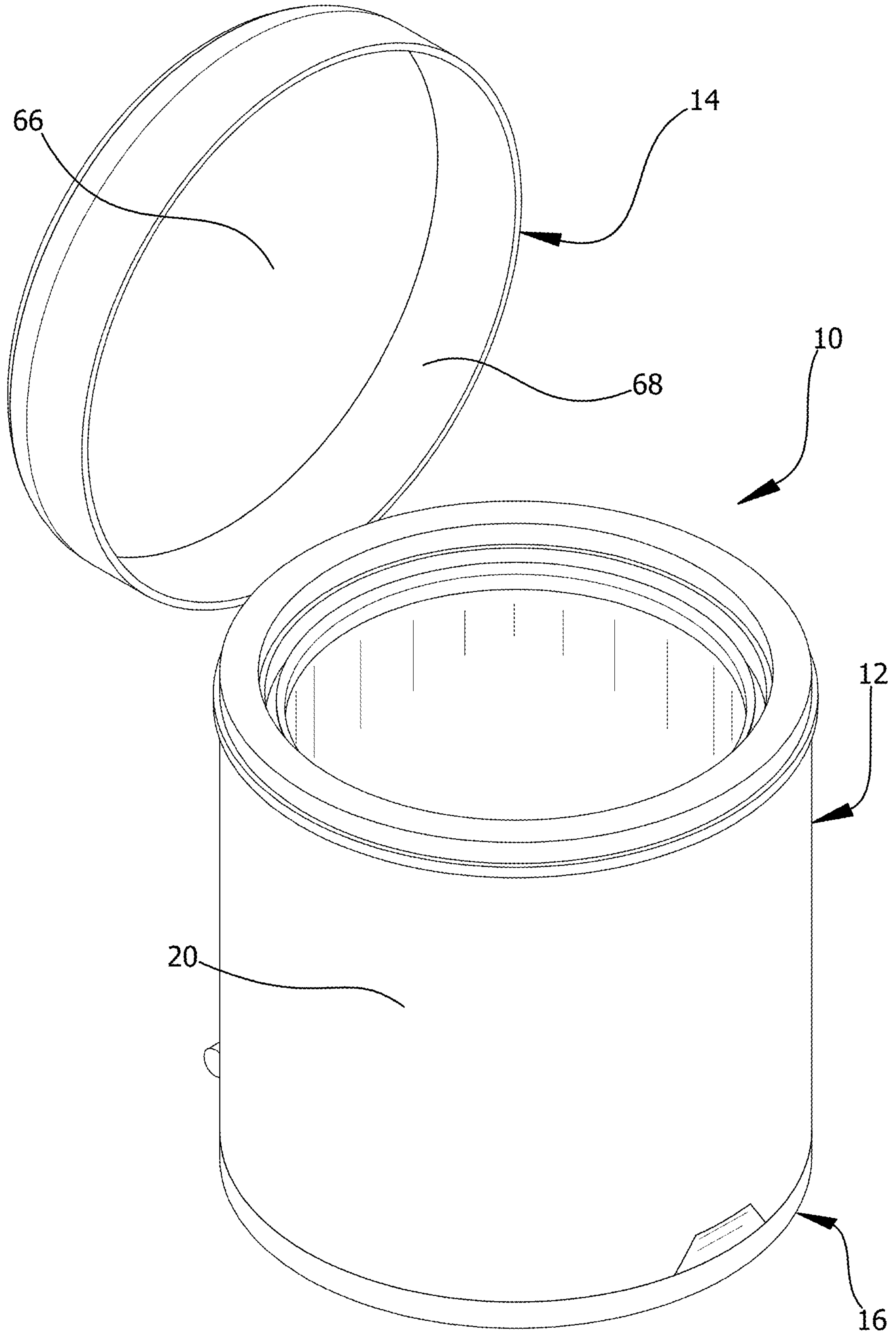
FIG. 10 is a perspective view of an alternative embodiment of the disclosure.

FIG. 10 shows an alternative embodiment of the refuse container 10, wherein the perimeter wall 20 is cylindrical. Each of the top cover 14 and the bottom cover 16 includes a flat top panel 66 and a cylindrical side wall 68. The receptacle 12 has a height in the range of 1.5 to 3.0 inches and a diameter in the range of 1.0 to 3.0 inches. The panel 46 is omitted in this embodiment.

As mentioned above, the refuse container 10 is used to collect and hold used chewing gum. To use the refuse container 10, the user first installs the ring 30, as shown in FIG. 6. The ring 30 has the tube 32 attached to it with the bag 18 partially rolled up in the tube 32. Once the ring 30 is attached, the user pushes the closed bottom portion 38 of the bag 18 through the central flaps 48 in the panel 46. The bottom cover 16 is opened so the user can connect the lock tab 54 to the anchor 40, as shown in FIG. 9. The refuse container 10 is now ready to receive a piece of used chewing gum 70. As shown in FIG. 7, a user places the piece of used chewing gum 70 onto the bag 18. As the user twists the anchor 40, the bag 18 is twisted and pulled downwardly, causing the bag 18 to twist around and envelop the piece of used chewing gum 70 while simultaneously pulling the piece of used chewing gum 70 through the central flaps 48, as shown in FIG. 8. Consequently, the bag 18 is further advanced out of the tube 32 to provide a new section of the bag 18 to receive another piece of used chewing gum 70. This process can be repeated and the anchor 40 will continue to twist and pull additional pieces of used chewing gum 70 into the receptacle 12, either until the receptacle 12 is full of the pieces of used chewing gum 70 or the bag 18 is completely unrolled. At that point, the pieces of used chewing gum 70 can be easily discarded with the bag 18. The ring 30 and tube 32 can also be removed and replaced with a new ring 30 and tube 32 containing a fresh bag 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A refuse container to hold pieces of used chewing gum comprising:

a receptacle being configured to contain up to 20 pieces of used chewing gum, said receptacle including a perimeter wall, said perimeter wall including a top portion being positioned about a top opening and a bottom edge portion being positioned about a bottom opening;

a top cover being coupled to said receptacle at said top portion, said top cover being pivotable to cover and uncover said top opening;

a ring being detachably coupled to said top portion, said ring being configured to extend around said top opening;

a tube being coupled to said ring, said tube being configured to extend along an interior circumference of said ring, said tube including a slot being positioned in an upper portion of said ring and extending along said tube;

a bag, said bag being sleeve-shaped, said bag including a stored portion being rolled up inside said tube and a closed bottom portion extending out through said slot and across said top opening; and a bottom cover being coupled to said receptacle at said bottom edge portion, said bottom cover being pivotable to cover and uncover said bottom opening, said bottom cover including an anchor projecting into said receptacle, said anchor being connectable to said closed bottom portion of said bag to hold said closed bottom portion of said bag, said anchor being rotatable relative to said perimeter wall to twist said bag about a piece of used chewing gum deposited on said bag and also draw and unroll an additional portion of said bag further out of said tube.

2. The refuse container of claim 1, further comprising a panel, wherein:

said panel is attached to an inner surface of said perimeter wall adjacent and below said top portion;

said panel is positioned to divide an interior space in said receptacle into an upper interior space and a lower interior space;

said panel includes central flaps divided by slots in said panel; and said flaps are resiliently flexible such that said flaps temporarily deform when the piece of used chewing gum is drawn through said flaps and then return to cinch said bag above the piece of used chewing gum.

3. The refuse container of claim 1, wherein said perimeter wall is oval-shaped with a pair of opposing flat lateral sections.

4. The refuse container of claim 3, wherein each of said top cover and said bottom cover is dome-shaped.

5. The refuse container of claim 4, wherein said receptacle has a height in the range of 1.5 to 3.0 inches, a width in the range of 1.5 to 3.0 inches, and a depth in the range of 0.5 to 1.0 inch.

6. The refuse container of claim 1, further comprising a lock tab being attached to said closed bottom portion of said bag, said lock tab being configured to be detachably coupled to said anchor.

7. The refuse container of claim 1, wherein each of said top cover and said bottom cover is detachably coupled to said perimeter wall by a spring-loaded snap assembly.

8. The refuse container of claim 1, wherein said perimeter wall is cylindrical.

9. The refuse container of claim 8, wherein each of said top cover and said bottom cover includes a flat top panel and a cylindrical side wall.

10. The refuse container of claim 9, wherein said receptacle has a height in the range of 1.5 to 3.0 inches and a diameter in the range of 1.0 to 3.0 inches.

11. The refuse container of claim 2, further comprising a lock tab being attached to said closed bottom portion of said bag, wherein:

said lock tab is configured to be detachably coupled to said anchor;

said perimeter wall is oval-shaped with a pair of opposing flat lateral sections;

each of said top cover and said bottom cover is dome-shaped;

said receptacle has a height in the range of 1.5 to 3.0 inches, a width in the range of 1.5 to 3.0 inches, and a depth in the range of 0.5 to 1.0 inch; and each of said top cover and said bottom cover is detachably coupled to said perimeter wall by a spring-loaded snap assembly.

12. The refuse container of claim 2, wherein:

said perimeter wall is cylindrical;

each of said top cover and said bottom cover includes a flat top panel and a cylindrical side wall; and said receptacle has a height in the range of 1.5 to 3.0 inches and a diameter in the range of 1.0 to 3.0 inches.

* * * * *